June 22, 1954
M. FRIEDMAN
2,681,945
ALKALINE STORAGE BATTERY
Filed June 6, 1952
2 Sheets-Sheet 1
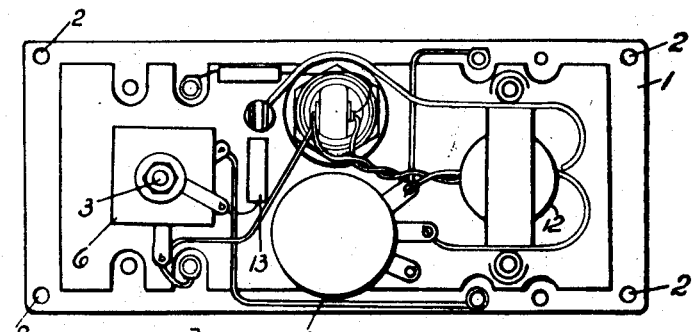
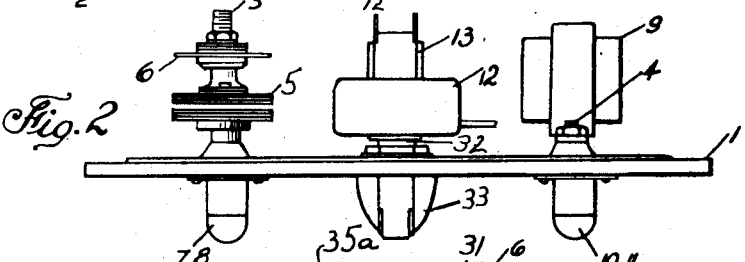
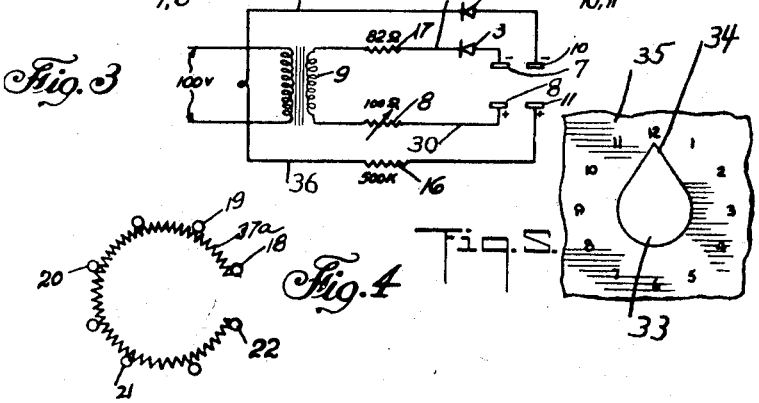
INVENTOR.
Maurice Friedman
BY
ATTORNEY

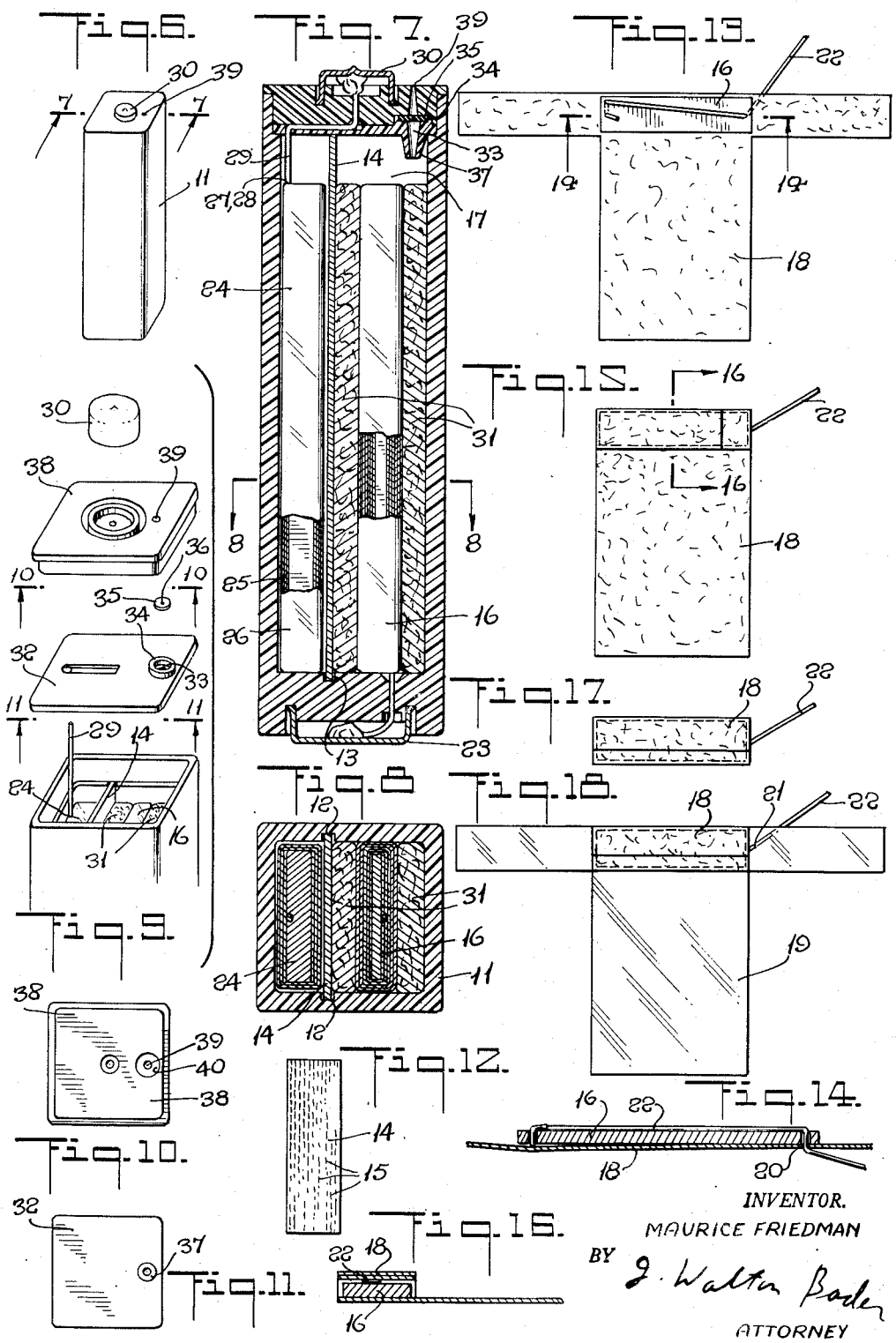

Patented June 22, 1954

2,681,945

UNITED STATES PATENT OFFICE 2,681,945

ALKALINE STORAGE BATTERY

Maurice Friedman, Forest Hills, N. Y., assignor to Galvanic Products Corporation, Valley Stream, N. Y., a corporation of New York Application June 6, 1952, Serial No. 292,112

2 Claims. (Cl. 136—6)

This invention relates to an alkaline storage battery and to a charger for use with same. The portion of the invention relating to the charger is not claimed in the present application but is claimed in another application which is a divisional application of the present case.

The portion of the invention relating to the battery involves improvements made to the battery which is the subject matter of my application Serial Number 160,189 filed May 5, 1950, now U. S. Patent No. 2,600,526.

In my experiments with this battery I discovered that there were several features which could stand improvement.

In the first place I discovered that the venting device used in the earlier battery would become blocked if the cement used to place the cover on the battery was not carefully applied, and in such a situation the gas pressures produced in the battery would burst the cell.

I also discovered that the barrier strip separating the electrodes would not completely fill the grooves provided for it and therefore would cause internal short circuits in the cell and so shorten its life.

I also discovered an improved method of producing a positive electrode for this cell when the conventional combination of zinc negative, silver oxide positive, and potassium hydroxide electrolyte is used with the construction of this invention.

The invention also relates to a unique battery charger which is extremely useful for recharging the battery disclosed in this invention when the battery is used as a hearing aid cell. In this novel construction the battery charger is calibrated in hours of use of the cell to be charged so that a cell will be fully charged in a constant interval of time no matter how long it has been used.

The objects of this invention are set forth in the above paragraphs.

The invention will be further described by reference to the drawings which are made a part of this specification.

Fig. 1 is a bottom view of the charger of this invention showing the internal construction.

Fig. 2 is a top view of the charger of this invention with the casing removed.

Fig. 3 is a circuit diagram of the electrical connections used in the charger of this invention.

Fig. 4 is a schematic view of the variable resistance used to control the output of charging current in the charger of this invention.

Fig. 5 is a view of the indicator plate and pointer of the charger of this invention showing the calibration thereof in hours of use of the same.

Fig. 6 is a perspective view of the battery of this invention, showing the parts thereof in exploded view.

Fig. 7 is a sectional view of the battery of this invention taken on lines 7—7 of Fig. 6.

Fig. 8 is a sectional view of the battery of this invention taken on lines 8—8 of Fig. 7.

Fig. 9 is a perspective view of the battery of this invention with the cover removed.

Fig. 10 is a sectional view of the battery of this invention taken along lines 10—10 of Fig. 6.

Fig. 11 is a sectional view of the battery of this invention taken on lines 11—11 of Fig. 6.

Fig. 12 is a detail view of the separator strip used in this invention showing the direction of the fibers thereof.

Fig. 13 is a front view of the negative electrode of the battery of this invention showing the first step in the wrapping of the absorbent material thereon.

Fig. 15 is a front view of the negative electrode of this invention showing the second step in the wrapping of the absorbent material on the negative electrode of the battery of this invention.

Fig. 14 is a sectional view through the negative electrode of the battery of this invention taken on lines 14—14 of Fig. 13.

Fig. 16 is a sectional view through the negative electrode of the battery of this invention taken on lines 16—16 of Fig. 15.

Fig. 17 is a front view of the negative electrode of the battery of this invention showing the absorbent material fully wrapped about the electrode.

Fig. 18 is a front view of the negative electrode of the battery of this invention with the absorbent material fully wrapped about same and the additional wrapper which is applied on the outside of the first-named wrapper about to be applied.

Referring to the battery of this invention shown in Figs. 6–18 there are provided container 11 which houses the various elements of the battery. Container 11 is provided with internal grooves 12 along two of its sides and preferably, but not essentially, also is provided with internal groove 13 on the bottom thereof.

Separator 14, which is made of a fibrous material capable of expansion between the fibers thereof due to the action of the electrolyte, is adapted to fit within grooves 12 and 13. Preferred material for separator 14 is parchmentized paper but asbestos sheet or similar material may also be employed.

Separator 14 is so prepared that fibers 15 in separator 14 all run in one direction parallel to grooves 12. Since separator 14 is capable of expansion between fibers 15 by the action of the electrolyte contained in the cell, separator 14 fits snugly into grooves 12 and thus prevents internal short circuits in the cell. This fact is of extreme importance in a small battery which is repeatedly charged and recharged and represents a considerable advance in the art.

Negative electrode 16 which is preferably made of zinc in the form of a plate is disposed in compartment 17 which is formed in container 11 by the presence of separator 14. Negative electrode 16 is preferably wrapped with an absorbent material (paper or cotton felt) so as to confine the electrolyte in close proximity to the electrode, and additional wrapper 19, preferably made of polyvinyl alcohol, cellulose acetate, treated polyethylene, treated polystyrene, or cellophane is disposed about wrapper 18. Wrappers 18 and 19 are provided with holes 20 and 21 through which a lead wire 22 projects. Lead wire 22 extends through the bottom of the battery and is secured to cap 23 located thereon.

Positive electrode 24 is preferably composed of silver and silver oxide powders wherein the silver acts as a binder for the silver oxide. Positive electrode 24 is also preferably surrounded by absorbent material 25 similar to absorbent material 18 and an additional wrapper 26 surrounding absorbent material 25 similar to wrapper 19. Wrappers 25 and 26 are also provided with holes 27 and 28 similar in function to holes 20 and 21. Lead wire 29 extends through the top of the battery and is secured to cap 30 located thereon. When this construction is used in a small rechargeable storage battery of the "dry cell" type it is preferable to provide additional absorbent material (paper, cotton, or felt) 31 between the negative and positive electrodes in order to prevent any electrolyte from leaking from the battery.

Cover member 32 is disposed over container 11. Cover member 32 is provided with aperture 33 therein and upstanding member 34 surrounding aperture 33 in spaced relationship thereto. Gasket 35 which is made of a yieldable material such as natural or synthetic rubber or plastic material is disposed within upstanding member 34. Gasket 35 is provided with a pin prick opening 36 which is normally closed unless distended by gas pressure due to the pressure exerted by the yieldable material surrounding said opening. Cover member 32 may be also provided, if desired, with downwardly depending portion 37 surrounding aperture 33 in spaced relationship. This portion is provided to prevent capillary attraction of electrolyte to the outside of the battery.

Additional cover member 38 may also be provided. In such case cover member 38 is provided with aperture 39 which is designed to register with aperture 33. Recess 40 surrounds aperture 39 in spaced relationship thereto. Recess 40 is also designed to accommodate upstanding member 34 so that gasket 35 is firmly held within upstanding member 34.

It is obvious that this construction gives a highly efficient venting mechanism to the battery. It is also pointed out that in the former venting device disclosed by me, where the upstanding member was not present, if the cover of the battery was secured to the container by cement, in many instances the cement entered the pin-prick opening in the venting gasket and plugged it up. If this happened the cell would burst due to the gas pressure. The use of this type of venting device, with an upstanding member provided, prevents cement from reaching the venting gasket and plugging up the hole therein. This is extremely important in the mass production of this type of battery and represents a significant advance in the art.

Figs. 1–5 indicate the novel charger which has been developed for use with the battery of this invention when such battery is used as a hearing aid cell. It is well known to those skilled in this art that it is a continuous user of a small battery who desires that a battery be capable of repeated recharging. It formerly was necessary for a user of such a small rechargeable battery to charge the battery for approximately the same length of time that he had used it plus a small additional time for resistance losses. This meant, in many instances, that the user would have to awake in the middle of the night to turn off the charger. If the user did not do so he would overcharge the battery and ruin it.

In order to avoid this difficulty I have developed the charger described herein which is so designed that a battery will be fully charged within a 24 hour period provided that it is preset for the number of hours that the battery has been used. The invention also may embody the provision of a high voltage direct current to be applied to a high voltage primary battery (such as a hearing aid "B" battery) so that the battery may be "rejuvenated." It is pointed out that the current applied to this type of battery merely stirs up the electrolyte and exposes previously unused material in the battery so that a current can again be drawn from it. The battery is not "charged" in the sense that the low voltage secondary battery can be charged.

Referring now to the drawings in Figs. 1–5 there are provided supporting panel 1 provided with openings 2 so that panel 1 may be attached to a housing (not shown) by means of screws or similar fastening members (not shown).

Additional screw 3 secures rectifiers 5 and 6 to front panel 1. Front panel 1 also bears terminal clips 7 and 8 which are adapted to be connected to the terminals of a low voltage secondary battery. This battery is the ordinary low voltage "flashlight type" cell delivering about 1.5 volts. Lead wires 30 and 31 are secured to terminal clips 7 and 8. Lead wires 30 and 31 may be secured to a source of direct current, or preferably, since the device is primarily designed to operate on 110 volt 60 cycle alternating current to the secondary windings of a step down transformer delivering about 7 volts of current.

Variable resistor 12 is placed in series with lead wires 30 and 31. Variable resistor 12 is preferably controlled by shaft 32 which is secured to knob 33. Knob 33 bears pointer 34 which points to indicia borne by indicator plate 35 indicating hours of use. The circuit is so designed that the resistance applied to the device through variable resistor 12 is inversely proportional to the hours of use indicated. Thus the maximum resistance is applied when pointer 34 is set at "1" and minimum resistance is applied when pointer 34 is set at "12."

Since the device is primarily designed to operate on house alternating current it is necessary to provide rectifier 5 to change the alternating current delivered by the step down transformer to a direct current suitable for battery charging. In addition fixed resistance 17 is provided since the current delivered to battery terminals 7 and 8 would otherwise be too strong for battery charging.

Fixed resistance 17 and rectifier 5 are also placed in series with lead wires 30 and 31.

Lead wires 35 and 36 are secured to the primary windings of transformer 9 and carry an alternating current. Rectifier 6 and fixed resistance 16 are placed in series with lead wires 35 and 36. Lead wires 35a and 36 are also secured to terminals 10 and 11 which are borne on front panel 1. Terminals 10 and 11 are adapted to bear a high voltage "B" battery. Fixed resistance 16 is provided in order to prevent too high a current from reaching terminals 10 and 11.

It is pointed out, however, that since this current is merely an "exciting" current the amount thereof need not be carefully controlled.

With the above structure the operation of this device can be easily explained. In this explanation it will be assumed that the battery draws 35 milliamperes per hour but this figure is merely arbitrary and any other figure would do equally well. It is not intended that the invention be limited to the charging of a battery drawing this amount of current.

Variable resistor 12 bears points 18, 19, 20, 21, 22, and 31a which are so designed to deliver a fixed amount of current. If a 5 milliampere battery were used resistor 12 would be set, for example to deliver 35/24 milliamperes plus an additional amount of about 1-5% to compensate for resistance losses. This setting would be used if pointer 34 were set to "1" since, in that event, the battery to be charged would have used up 5 milliampere-hours of current.

By the same token if the battery were used 12 hours resistor 12 would be set to deliver 17.5 milliamperes of charging current so that in 24 hours the battery would be fully charged. In this case also an additional amount of from 1-5% to compensate for resistance losses could also be added.

Since the greater the number of hours of use of the battery to be charged the greater the current that must be supplied it is clear that the resistance applied by resistor 12 will be inversely proportional to the hours of use. Obviously the greater the resistance the less the current.

It is pointed out that the current supplied to the "B" battery is constant since this current only acts as an "exciter" and not as a charging current.

The foregoing specific embodiments of this invention as set forth in the foregoing specification are for illustrative purposes and for purposes of example only.

Various changes and modifications can obviously be made within the spirit and scope of this invention and will occur to those skilled in this art.

I claim:

1. In a battery comprising a container provided with an internal groove in two sides thereof, a cover for said container, a positive electrode, a negative electrode, and a lead wire secured to each of said electrodes; the new structure comprising a separator strip between said electrodes disposed within said internal grooves, said separator strip being composed of a fibrous material capable of expansion between said fibers due to the action of the electrolyte in the battery, said fibers running parallel in one direction so that said separator strip completely fills said groove preventing internal short circuits when the battery is in operation.

2. In a battery comprising a container provided with internal grooves on two sides thereof dividing said container into two portions, a positive electrode disposed within one of said portions, a negative electrode disposed within the other of said portions, and lead wires secured to each of said electrodes; the new construction which comprises a separator strip composed of a parchment paper disposed within said internal grooves, between said electrodes, the fibers of said separator strip running parallel to said grooves, said separator strip being capable of expansion between said fibers due to the action of said alkaline electrolyte, so that said separator strip completely fills said grooves thereby preventing internal short circuits when the battery is in operation.

References Cited in the file of this patent

UNITED STATES PATENTS

| Number | Name | Date |
| --- | --- | --- |
| 789,877 | Perry | May 16, 1905 |
| 897,833 | Hubbell | Sept. 1, 1908 |
| 931,081 | Perry | Aug. 17, 1909 |
| 1,375,740 | Studebaker et al. | Apr. 26, 1921 |
| 1,875,868 | Heald | Sept. 6, 1932 |
| 1,997,179 | Logan | Apr. 9, 1935 |
| 2,138,652 | Biermanns | Nov. 29, 1938 |
| 2,203,797 | Pearson | June 11, 1940 |
| 2,424,344 | Veinott | July 22, 1947 |
| 2,484,959 | Redekopp | Oct. 18, 1949 |
| 2,536,806 | Hansen, Jr. | Jan. 2, 1951 |
| 2,578,534 | Giles et al. | Dec. 11, 1951 |
| 2,601,133 | Yardeny | June 17, 1952 |